Inventors
CHARLES GRANET
GEORGES EMILE ROBERT ROLAND
ROBERT RODOLPHE CRAUC
By Toulmin & Toulmin
Attorneys Inventors
CHARLES GRANET
GEORGES EMILE ROBERT ROLAND
ROBERT RODOLPHE CRAUC By Toulmin & Toulmin
Attorneys

United States Patent Office 3,017,197
Patented Jan. 16, 1962

3,017,197
ADJUSTABLE SHOCK ABSORBER FOR VEHICLES WITH PNEUMATIC SUSPENSION
Charles Granet, 17 Rue Essling, Courbevoie, Georges Emile Robert Roland, 25 Blvd. d'Argenson, Neuilly, and Robert Rodolphe Crauc, 52 Rue Raphael, Vanves, all of France
Filed Oct. 26, 1959, Ser. No. 848,771
Claims priority, application France Nov. 6, 1958
5 Claims. (Cl. 280—124)

To avoid the integral transmission of the jolts of any kind to the frame of a vehicle, a suspension effected either with springs or with pneumatic means has to be provided on the frame.

To deaden the oscillations of the suspension, a mechanical or hydraulic damper is provided, a part of this damper being rigidly locked with the frame and the other part being rigidly locked with the movable element, for instance with an axle of the vehicle.

Such dampers have already been proposed and various types have been designed in which the deadening strength in the damper is regulated in function with the load in the vehicle.

Nevertheless, in the case of such vehicles equipped with a pneumatic suspension, the adjustment of the damper in function with the load is inoperative as, since the pneumatic suspension is designed to permanently keep the frame at the same level, the damper remains always in its mean position whatever the load may be.

The present invention aims at coping with this difficulty and is concerned with a damper adapted to be mounted on vehicles provided with a pneumatic suspension, for example of the type above mentioned. This damper is characterized in that it includes means actuated by the pressure existing in the pneumatic suspension and acting upon one of the elements of the damper to bring its resistance to vary in the same sense as the hardening of the pneumatic suspension.

According to a first embodiment, these means are constituted by a piston slidable in a cylinder which is connected by one of its heads with the supply channel of the pneumatic suspension, the rod of said piston, counterbalanced by an antagonistic pressure, for example by a spring, acting upon the elements which modify the hardening of the damper, for example upon the valves controlling the oil flow in the damper.

Preferably the piston-rod will act upon said valves through a cam freely mounted on the shaft bearing the crank pin, the cam being linked with the rod by a stud and stud hole or a similar link.

Preferably, the stud hole which can be replaced by a notch or a groove is provided in a piece mounted on the piston rod or supported by same while the stud is supported by the cam.

According to a preferred form of embodiment, the notched piece is mounted on the piston rod and the notched part engages a fork provided in the cam, the stud being constituted by an axis passing through said fork.

By way of example, a form of embodiment of the invention applied to an hydraulic damper has been illustrated in the annexed drawing.

Figure 1:
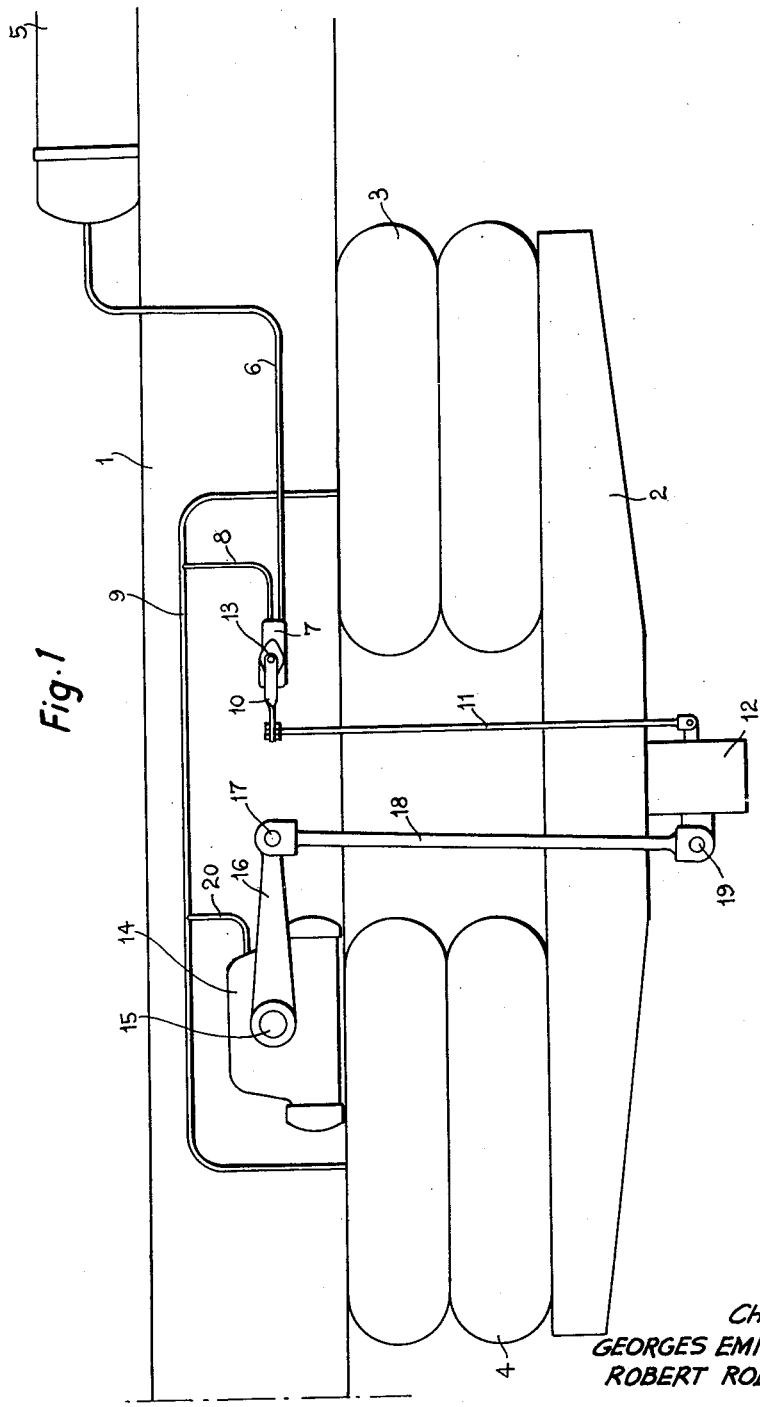
FIGURE 1 shows schematically the arrangement of a pneumatic suspension combined with a damper controlled by the pressure existing in the suspension.

As shown in FIGURE 1, a pneumatic suspension, constituted by two pneumatic springs 3, 4, is provided between the frame 1 and an element situated at a fixed height above the ground, for example the crosspiece 2 supporting the axle (not shown). The pneumatic springs are connected with a reservoir of compressed air 5 by a pipe 6 which includes a regulation valve 7, the casing of which is rigidly locked with the frame 1. The pipe 8 starting from this valve is connected with the pipe 9 leading to the pneumatic springs 3, 4. On the element controlling the valve 7 is fixed in 13 a rod 10 connected by a tie-rod 11 with a part 12 rigidly locked with the cross-piece 2. When the frame is loaded, it sinks, compressing the pneumatic springs 3, 4 and carries along the casing of the valve. As the rod 10 remains steady, the valve 7 opens and air flows from the reservoir 5 into the springs 3, 4 until the frame 1 is brought back in its initial position. The valve 7 closes at that moment, as the distance between the cross-piece 2 and the frame 1 is the same as the distance existing before the loading of the frame.

As previously indicated, a damper or shock absorber is associated with the pneumatic suspension. This damper is contained in a casing 14 fixed to the frame 1 and includes a shaft 15 upon which is fixed a lever 16 linked in 17 to a small connecting-rod 18 which in turn is linked in 19 to the element 12 rigidly connected to the cross-piece. 2.

When the frame 1 sinks on account of a load, lever 16 rocks the shaft 15 which increases, in a known manner, the absorption of the shock in function of the load, but, as above explained, since the pneumatic suspension restores to its normal valve distance between the frame 1 and the cross-piece 2, it brings back the lever 16 to its neutral position and cancels the adjustment of the damper in function of the load. There exists, consequently, an incompatibility between the pneumatic suspension and the shock absorber the dampening effect of which remains the same no matter the load.

Figure 2:
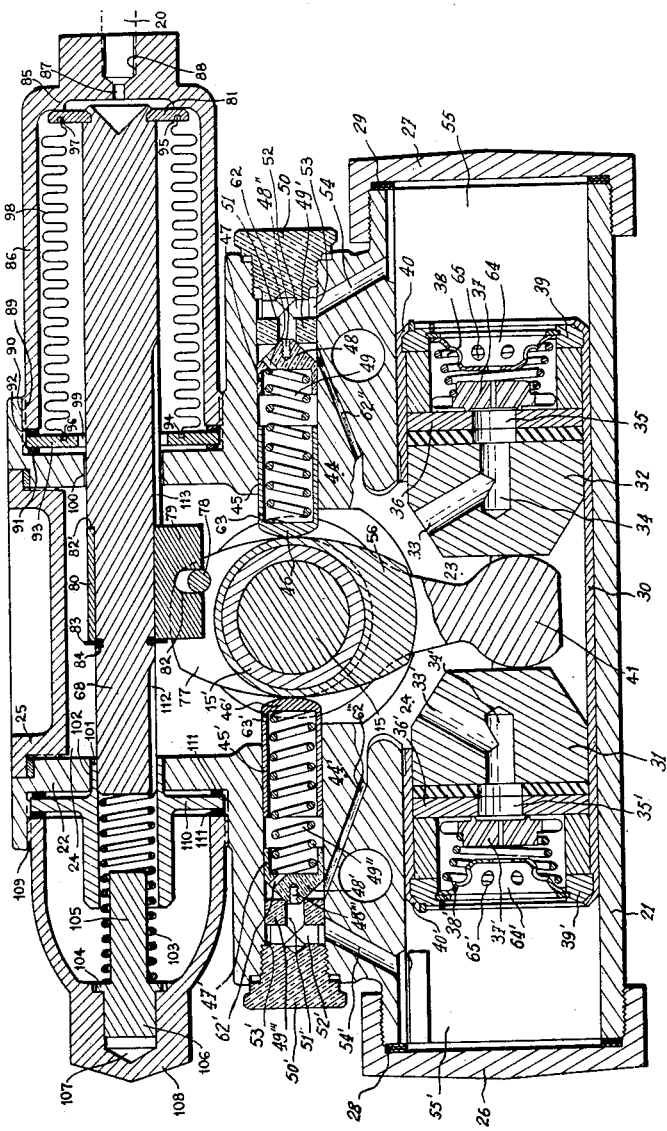
FIGURE 2 is a sectional elevation of the damper according to the invention, some parts being broken away.

In order to have a dampening effect which varies with the load, even after restoration of the pressure in the pneumatic springs 3, 4 bringing the frame at its normal level, the invention provides a pipe 20 connected to the pipe 9 through which the said springs 3, 4 are fed with air from the reservoir and leads to the damper as illustrated in FIGURE 2.

The damper, generally designated by the reference character 14 in FIGURE 1, includes a cylinder 21 on which is superposed a casing 22 formed in one piece with and communicating with said cylinder by a central passage 23, the cavity 24 of the casing 22 being closed after filling by a suitable plug 25.

The cylinder 21 is closed at both ends by caps 26, 27, with the interposition of seals 28, 29, the said caps being preferably screwed onto the cylinder 21.

Slidable in the cylinder 21 is a hollow piston 30 with two heads, 31, 32, provided with channels 33, 34—33', 34', opening respectively at 35, 35', into pieces 36, 36', constituting the seatings of valves 37, 37', loaded by springs 38, 38', which also abut on abutments 39, 39', which are held in the head of the cylinder by appropriate means, for instance by the incurved rims, 40, 40', of the wall of the piston 30. Between the heads 31 and 32 is disposed a crank 41, rotatively fast on the shaft 15 (see FIGURE 1) on which is keyed the lever 16 which receives the oscillations through the small rod, as shown in FIGURE 1. In front of the valves 37, 37', are provided abutments formed by caps 64, 64', provided with bores 65, 65', said caps limiting the stroke of the valves 37, 37'.

Two variably loaded valves are each disposed in a boss 44, 44', of the casing 22 and each comprises a tubular element 45, 45', terminating on the side next to the shaft 15 in a base 46, 46', and a tubular element 47, 47', terminating in a conical head 48, 48', the two tubular elements being held apart from one another by a spring 49, 49″. The point of the conical element 48, 48′ cooperates with the bottom 49′, 49‴ of a plug 50, 50′, provided with an axial passage 51, 51′ communicating with radial passages 52, 52′: these passages in turn, by means of an annular groove 53, 53′, communicate with the side channel 54, 54′, connected with the corresponding working chamber 55, 55′ in one end of the cylinder 21. Openings 63, 63′ and 62, 62′ prevent a compression of oil between the tubular elements 45—47 and 45′—47′, when the spring 49, 49″ is compressed and in front of the opening 62, 62′ ends a channel 62″, 62‴, which channel also communicates with the inner space of the casing 22.

It is to be observed that the construction of the variably loaded valves is carried out in such a way as to enable their constituent parts to be easily dismantled for replacement of springs such as 49 and 49″. For this, it suffices to unscrew the plug 50, 50′, to insert a suitable tool in the tapped hole 48″, 48‴ of the tubular element 47, 47′ which thus can be extracted to give access to the spring 49, 49″.

The base 46, 46′, of the tubular element 45, 45′, preferably, has the form of a spherical dome which bears on a cam 56, symmetrical with respect to the transversal plane of symmetry of the crank 1 and also with respect to the plane perpendicular to said plane containing the center line of the shaft 15 upon which is fast the crank 41.

According to the invention, this cam 56 is freely mounted by means of a ring 15′ on the shaft 15 upon which is fast the crank 41 which thus oscillates with the shaft 15. Its upper part, in the drawing, is shaped as a fork-joint, of which one cheek only, 77, is shown: these two cheeks support an axle 78. The extension 79 of an element 80 mounted upon the rod 68 of a piston 81 engages freely said fork-joint. A notch 82 provided in the extension 79 engages the axle 78.

The element 80 on the rod 68 bears upon an abutment 82′ and is kept in position by a stop washer 83 which engages a groove 84.

To the right, the rod 68 bears a piston 81 which, in the position illustrated in the drawing, is applied against the head 85 of a cylinder 86, the head 85 being centrally bored in 87: this opening is tapped in 88 to receive a threaded coupling at the end of the pipe 20 leading to the pneumatic springs (illustrated in FIGURE 1).

The cylinder 86, the left (in the drawing) head of which is suppressed, bears a thread 89 engaging a tapping 90 provided in the casing 22 and acts by means of two tight washers 90, 91 as a screwing device for a disc 93.

The inner faces of the discs 93 and 81 are respectively provided with circular grooves 94, 95, into which are welded in 96, 97, the ends of a compressible mechanical bellows 98. The bellows 98 surrounds the rod 68 which crosses freely the disc 93 through a center opening 99 and the right wall of the casing through the opening 100.

The other end of the rod 68 has a smaller diameter than the part of the rod at the right of the abutment 82′ and is guided in a sleeve 101, a part of which is engaged in an opening 102 provided in the wall 22, aligned with the opening 100; the other part of said sleeve 101 acts as a guiding for a spring 103. The spring abuts at one end of the rod 68 and at the other end on the shoulder 104 of an element provided with a cylindrical extension 105 housed in the spring 103 and a head 106 housed in the casing 107 of a cap 108 screwed in 109 in the casing 22 and serving as a tightening device for a flange 110 supported by the sleeve and on both sides of which are provided tightening washers 111.

As the level of the oil in the damper is normally above the axis of the rod 68 and as thereby the compressible bellows and the inner space in the cap 108 are, at least partly, filled up with oil, it is necessary to provide for a connection between the chamber 24 of the damper on the one hand and the bellows and the inner space in the cap 108 on the other hand. This is obtained thanks to millings 112, 113, provided on the rod 68 on both sides of the element 80.

The damper of FIGURE 2 operates as follows: Assuming that the frame 1 (see FIGURE 1) receives a load, the springs 3, 4, are depressed by the lowering of the frame and simultaneously the lever 16 of the damper swings counterclockwise of a given angle, generating thereby the corresponding rotation of the shaft 15 and of the crank 41, said crank in FIGURE 2 moving towards the right. This movement has no action on the cam 56 and thereby on the variably loaded valves 48, 48′.

During the lowering of the frame 1 with respect to the cross-piece 2, the valve 10 opens, allowing the air to flow from the reservoir 5, through the pipes 6, 8, 9 in the springs 3, 4, to restore the pressure and bring the frame back to its initial level, but, in same time, as the air flows in the springs 3, 4, it enters the pipe 20 and the coupling 88 in the chamber located in front of the piston 81 slidable in the cylinder 86. The compressed air acts upon the right face of the piston 81 and said piston is forced back with its rod 68 towards the left, against the action of the balancing spring 103. When moving towards the left, the rod 68 carries along the element 80. This element 80, thanks to the notch 82 engaged by a stud 78 supported by the cam 56, rotates said cam counterclockwise of an angle corresponding to the axial displacement of the rod 68, and thereby to the pressure restored in the pneumatic springs to bring back the frame to its initial level. During this rotary motion of the cam 56, the springs 49, 49″ of the valves 48 and 48′ are compressed and these valves are pressed against their seats in function of the pressure in the springs, and consequently of the load on the frame. When the frame reaches its initial level thanks to the admission of air in the pneumatic springs, the valve 10 closes and shuts off the admission of air in the springs 3, 4, and thereby in the damper, the rod 68 and the cam 56 remaining in their adjusted position.

It is to be noted that, when the frame 1 is brought back to its initial level, the lever 16 is in its neutral position, whatever may be the position of the cam 56 and the pressure applying the valves 48 and 48′ upon their seats so that the amplitude of the oscillations of the lever 16 is independent of the adjustment of these valves in function of the load.

During the movement of the piston 81 towards the left, the bellows 98, which practically is filled up with oil, is compressed as the disc 93 is stationary. To prevent a compression of the oil in the bellows 98, its inner space communicates freely with the chamber 24 of the damper through the milling 113 provided on the rod 68 and the opening 99 provided in the disc 93.

A similar free communication exists also, and with the same object, between the inner space of the cap 108 and the chamber 24 of the damper, through the milling 112 provided on the rod 68 and extends from the left end of said rod up to the vicinity of the resilient ring 83.

The damper, the operation of which has been described, is responsive to the slightest beating of the crank 41, hence to the slightest oscillations of the frame. If it is desired for the damper to be ineffective for the oscillations having a small amplitude, the damper is made as shown in FIGURE 3.

Figure 3:
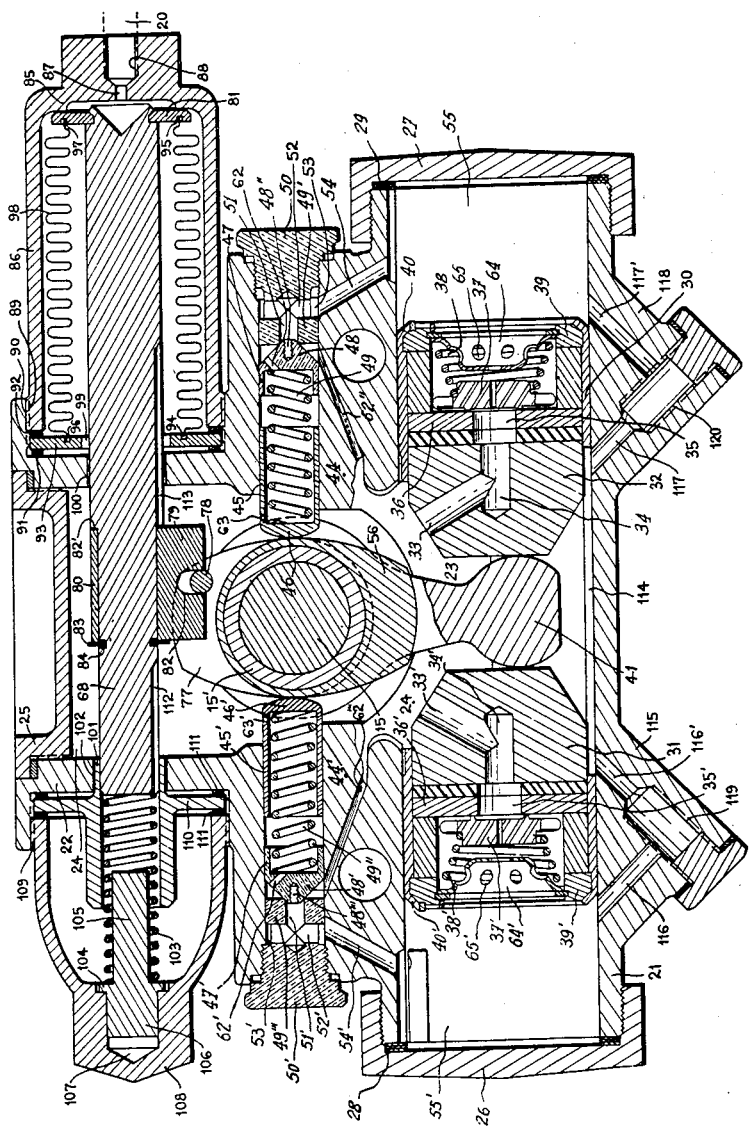
FIGURE 3 shows the damper according to FIGURE 2 but includes, in addition, means to make it irresponsive to the oscillations having a small amplitude.

In actual fact, the damper of FIGURE 3 is identical to the damper of FIGURE 2, the same elements being designated by the same reference characters but, to reduce or to entirely suppress the action of the damper at the small amplitudes, a free communication is provided between the center chamber 23 and the two outer chambers 55 and 55′ as shown in the lower part of the FIGURE 3.

For this purpose, a long groove 114 is provided in the piston 30 from the head 31 to the head 32. Plumb with the head 31, in the boss 115 of the cylinder, is provided a leakage channel 116—116', which opens, when the members of the damper are in their normal position as shown, in the window 114, on the one hand and in the chamber 55' on the other hand.

A similar leakage channel 117—117' is provided in the boss 118 and is associated with the head 32.

As long as the channels 116 and 117' are not closed by the piston when said piston oscillates, the oil flows freely between the chamber 23 and the two chambers 55, 55' and the oscillations are not damped. With more important oscillations for which the piston 30 closes in turn the channels 116 and 117', the damper brings about the lamination of the flow of oil and thereby plays its part of damper.

The channels 116' and 117 include tappings 119, 120, in which plugs can be screwed to obturate the leakage channels 116—116' and 117—117'. The damper equipped with these plugs works like the damper of FIGURE 2, in spite of the existence of the groove 114 in the wall of the cylinder.

What is claimed is:

1. A shock absorber adapted to be mounted on vehicles provided with a pneumatic suspension communicating with a reservoir of compressed air by means of a valve controlling the admission of compressed air in the suspension in accordance with the actual load of the vehicle, comprising in combination, a casing in which is formed a cylinder space closed at both ends and a reservoir space for hydraulic fluid, which spaces communicate freely with each other, a double-headed hollow piston slidable in said cylinder and defining a working chamber of variable volume at each end of said cylinder, the interior of said piston being in hydraulic communication with the reservoir, a non-return valve in each piston head enabling hydraulic fluid to pass from the interior of the piston into the working chamber adjacent to each valve, a shaft journalled in said casing and capable of oscillating around an axis situated above the axis of the cylinder and perpendicular thereto, a crank fixed on said shaft, having a median plane of symmetry and engaging the piston intermediate its ends, channels providing hydraulic communication between each working chamber and the reservoir, a non-return valve in each of said channels enabling hydraulic fluid to pass from each chamber into the reservoir, a valve seat arranged in said casing for each of said last-named non-return valves, a cam-follower resiliently connected to each of said last-named non-return valves, a cam freely mounted on said shaft, said cam follower engaging opposite faces of the cam, a rod capable of axial movement drivingly connected to said cam, a piston fixed on one end of said rod, a cylinder engaged over the piston and an adjacent portion of said rod, spring means acting against the end of said rod opposite to the end carrying the piston, and means connecting freely the cylinder to the pneumatic suspension, whereby the actual pressure in the suspension acts on the piston and causes, through the rod drivingly connected to the cam, angular adjustment thereof in accordance with the said actual pressure in the pneumatic suspension.

2. A shock absorber adapted to be mounted on vehicles provided with a pneumatic suspension communicating with a reservoir of compressed air by means of a valve controlling the admission of compressed air in the suspension in accordance with the actual load of the vehicle, comprising in combination, a casing in which is formed a cylinder space closed at both ends and a reservoir space for hydraulic fluid, which spaces communicate freely with each other, a double-headed hollow piston slidable in said cylinder and defining a working chamber of variable volume at each end of said cylinder, the interior of said piston being in hydraulic communication with the reservoir, a non-return-valve in each piston head enabling hydraulic fluid to pass from the interior of the piston into the working chamber adjacent to each valve, a shaft journalled in said casing and capable of oscillating around an axis situated above the axis of the cylinder and perpendicular thereto, a crank fixed on said shaft, having a median plane of symmetry and engaging the piston intermediate its ends, channels providing hydraulic communication between each working chamber and the reservoir, a non-return valve in each of said channels enabling hydraulic fluid to pass from each chamber into the reservoir, a valve seat arranged in said casing for each of said last-named non-return valves, a cam-follower resiliently connected to each of said last-named non-return valves, a cam freely mounted on said shaft, said cam-follower engaging opposite faces of the cam, a rod slidably disposed in the casing for axial movement and drivingly connected to the cam, a piston fixed at one end of said rod, a cylinder engaged over the piston and an adjacent portion of said rod, the inner face of the cylinder adjacent to the piston being formed as a seat for said piston, an expandable bellow disposed around the rod, between the piston and a bottom portion of said cylinder opposite to the face thereof forming a seat, means for establishing free communication between the reservoir space and the inner space of said bellow, spring means acting against the end of said rod opposite to the end carrying the piston and means connecting freely the cylinder to the pneumatic suspension, whereby the actual pressure in the suspension acts on the piston and causes, through the rod drivingly connected to the cam, angular adjustment thereof in accordance with said actual pressure in the pneumatic suspension.

3. A shock absorber adapted to be mounted on vehicles provided with a pneumatic suspension communicating with a reservoir of compressed air by means of a valve controlling the admission of compressed air in the suspension in accordance with the actual load of the vehicle, of the kind including at least a pair of spring controlled valve means and cam means disposed therebetween and adapted to act on said valve means, comprising in combination, a casing in which is formed a cylinder space closed at both ends and a reservoir space for hydraulic fluid, which spaces communicate freely with each other, a double-headed hollow piston slidable in said cylinder and defining a working chamber of variable volume at each end of said cylinder, the interior of said piston being in hydraulic communication with the reservoir, a by-pass formed in said cylinder and associated with each head of the said hollow piston for establishing a communication between each working chamber and the interior of the hollow piston, a rod slidably disposed in the casing for axial movement and drivingly connected to the cam means, a piston fixed at one end of said rod, a cylinder engaged over the piston and an adjacent portion of said rod, the inner face of the cylinder adjacent to the piston being formed as a seat for said piston, an expandable bellow disposed around the rod, between the piston and a bottom portion of said cylinder opposite to the face thereof forming a seat, means for establishing free communication between the reservoir space and the inner space of said bellow, spring means acting against the end of said rod opposite to the end carrying the piston and means connecting freely the cylinder to the pneumatic suspension, whereby the actual pressure in the suspension acts on the piston and causes, through the rod drivingly connected to the cam means, angular adjustment thereof in accordance with the actual pressure in the pneumatic suspension.

4. A shock absorber adapted to be mounted on vehicles provided with a pneumatic suspension communicating with a reservoir of compressed air by means of a piping including a valve controlling the admission of compressed air in the suspension in accordance with the load of the vehicle, of the kind including at least a pair of spring controlled valve means and cam means disposed therebetween and adapted to act on said valve means, in combination with a cylinder, a piston movable in said cylinder and subjected on one of its faces to the actual pressure in the pneumatic suspension, a piston rod extending through said cylinder and having a part projecting outwards from said cylinder, a balance spring bearing against the free end of said piston rod, a sleeve mounted on the piston rod and provided with a grooved extension, and a slot on said cam means provided with a transverse pin cooperating with the grooved extension, whereby any displacement of the piston rod in accordance with the actual pressure in the pneumatic suspension results in an angular motion of said cam means.

5. A shock absorber according to claim 4, in which a compressible bellow is disposed within the cylinder, around the piston rod, said bellow being tightly fixed on the piston and on a washer disposed at the end of the cylinder remote from the piston when the bellow is expanded.

References Cited in the file of this patent
UNITED STATES PATENTS

| | | |
|---|---|---|
| 1,893,339 | Royce | Jan. 3, 1933 |
| 2,003,823 | Bucklen | June 4, 1935 |
| 2,150,576 | Bell | Mar. 14, 1939 |
| 2,927,540 | Seley | Mar. 8, 1960 |

FOREIGN PATENTS

| | | |
|---|---|---|
| 745,728 | France | Feb. 21, 1933 |